United States Patent
Hyun et al.

(10) Patent No.: US 7,583,986 B2
(45) Date of Patent: Sep. 1, 2009

(54) ACTUATOR MODULE OF WIRELESS COMMUNICATION TERMINALS

(75) Inventors: Bu Whan Hyun, Suwon (KR); Wook Hee Lee, Yongin (KR)

(73) Assignee: Samsung Electro-Mechanics Co., Ltd., Suwon, Kyungki-Do (KR)

( * ) Notice: Subject to any disclaimer, the term of this patent is extended or adjusted under 35 U.S.C. 154(b) by 425 days.

(21) Appl. No.: 11/316,902

(22) Filed: Dec. 27, 2005

(65) Prior Publication Data

US 2006/0251281 A1 Nov. 9, 2006

(30) Foreign Application Priority Data

Apr. 26, 2005 (KR) .................. 10-2005-0034352

(51) Int. Cl.
*H04M 1/00* (2006.01)

(52) U.S. Cl. ............... 455/575.1; 455/575.3; 455/90.1

(58) Field of Classification Search ............. 455/569.1, 455/575.1
See application file for complete search history.

(56) References Cited

U.S. PATENT DOCUMENTS

| | | | |
|---|---|---|---|
| 3,627,930 A | 12/1971 | Tolman | |
| 4,058,690 A | 11/1977 | Serkez | |
| 4,124,785 A | 11/1978 | Seretny et al. | |
| 4,796,288 A | 1/1989 | Busche et al. | |
| 5,201,069 A | 4/1993 | Barabolak | |
| 6,570,992 B1 | 5/2003 | Folan et al. | |
| 7,110,536 B2 * | 9/2006 | Hampton et al. | 379/433.02 |
| 7,113,740 B2 * | 9/2006 | Kuchiishi et al. | 455/3.06 |
| 7,395,095 B2 * | 7/2008 | Schrack | 455/569.1 |
| 2004/0097258 A1 * | 5/2004 | Lee et al. | 455/550.1 |
| 2004/0253995 A1 * | 12/2004 | Matsumoto et al. | 455/569.1 |
| 2005/0266892 A1 | 12/2005 | Schrack | |

FOREIGN PATENT DOCUMENTS

| | | |
|---|---|---|
| EP | 0789473 | 8/1997 |
| JP | 2003158565 | 5/2003 |
| KR | 10-2005-12121 | 1/2005 |
| WO | WO2004077875 | 9/2004 |

OTHER PUBLICATIONS

Search Report from the UK Patent Office.
Korean Intellectual Property Office, Office Action mailed Sep. 27, 2006.
German Patent Office, Office Action issued Feb. 27, 2009.

* cited by examiner

*Primary Examiner*—Lana N Le
(74) *Attorney, Agent, or Firm*—Lowe Hauptman Ham & Berner (57) ABSTRACT

Disclosed herein is an actuator module for wireless communication terminals. The actuator module comprises at least one actuator, an upper base for receiving the actuator on a lower surface thereof, a lower base assembled to the upper base while defining an inner space of a predetermined volume with respect to the upper base, and a connecting member having a body fixed to an upper surface of the lower base. One end of the body is exposed from a lower surface of the lower base, and the other end thereof is electrically connected with the actuator when the upper and lower bases are coupled to each other. With the construction, electrical connection between the actuator and a substrate can be conveniently obtained with reduced manufacturing costs thereof. In addition, assembly of the actuator and the substrate can be simplified via efficient use of the inner space of a terminal body.

23 Claims, 11 Drawing Sheets

ACTUATOR MODULE OF WIRELESS COMMUNICATION TERMINALS

RELATED APPLICATION

The present invention is based on, and claims priority from, Korean Application Number 2005-34352, filed Apr. 26, 2005, the disclosure of which is incorporated by reference herein in its entirety.

BACKGROUND OF THE INVENTION

1. Field of the Invention

The present invention relates to an actuator module of wireless communication terminals. More particularly, the present invention relates to an actuator module of wireless communication terminals, which has a simplified terminal structure for connecting an actuator and a substrate, and can allow convenient operation of electric connection therebetween.

2. Description of the Related Art

Generally, wireless communication terminals refer to portable communication devices, which can transmit/receive audio, characters and images through wireless communication, such as personal communication service terminals, smart phones, international mobile telecommunication for the 2000s (IMT-2000), wireless local area network (LAN) terminals, and the like.

Such a wireless communication terminal has an antenna, such as a helical antenna or a dipole antenna, which can serve to enhance transmission and reception sensitivity. Both helical antenna and dipole antenna are external antennas, and protruded to an outside of the communication terminal.

Such external antennas have an advantage of a non-directional radiation characteristic. However, since these antennas protrude from the communication terminal, there are problems in that the antennas are likely to be damaged by external force, inconvenient to carry, and make it difficult to provide an aesthetic appearance to the terminal.

In order to solve the above mentioned problems, planar antennas such as micro-strip patch antennas, inverted F-type antennas, etc. have been suggested as a built in-type antenna, which is embedded inside the terminal without being exposed to the outside.

Figure 1:
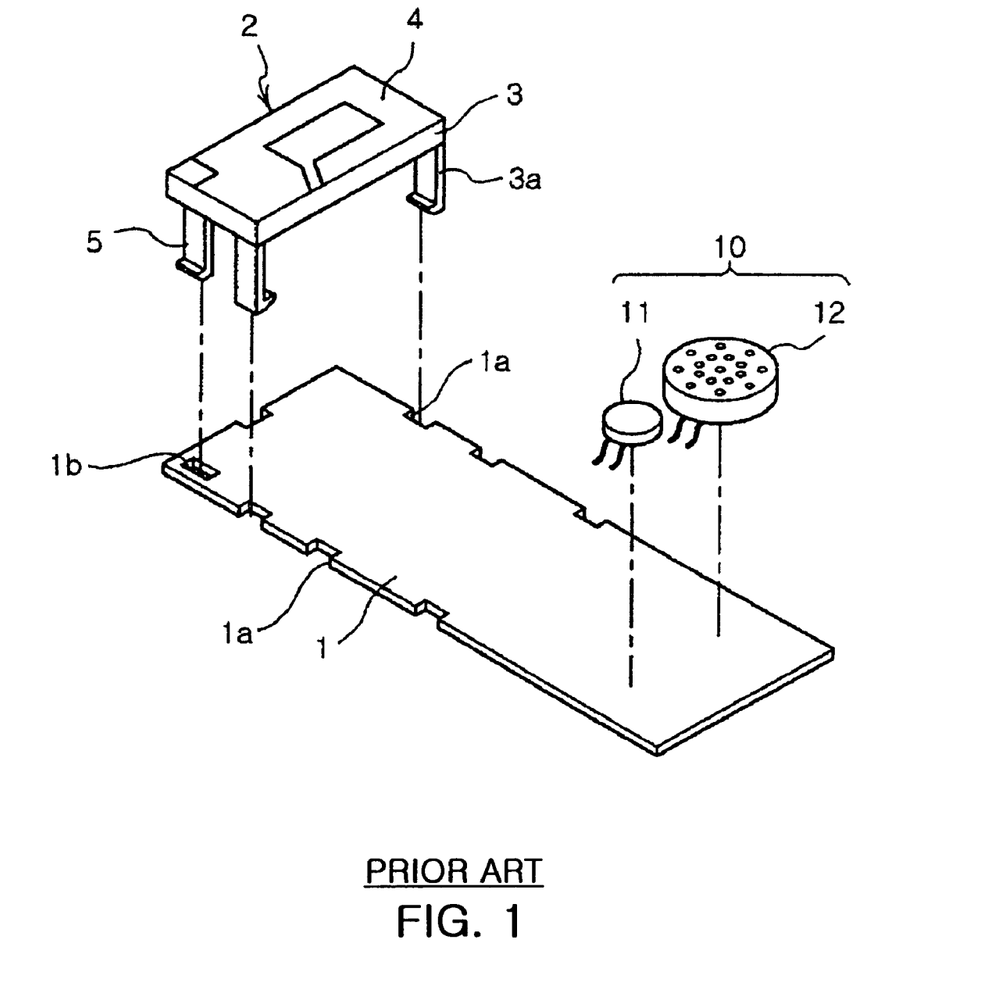
FIG. 1 is an exploded perspective view schematically illustrating a conventional wireless communication terminal in which a built-in type antenna and an actuator are dissembled from a substrate of the terminal.

FIG. 1 is an exploded perspective view schematically illustrating a conventional wireless communication terminal in which the built-in type antenna and an actuator are dissembled from a substrate of the terminal. Referring to FIG. 1, an antenna module 2 is detachably attached to a substrate 1 of a terminal body (not shown) by means of hooks.

The antenna module 2 comprises a supporter 3, a plurality of coupling legs extending from a lower surface of the supporter 3 corresponding to coupling grooves 1a formed on the substrate 1, a plate-shaped metallic conductive portion 4 formed on an upper surface of the supporter 3, and a feeder 5 extending from the conductive portion 4, in which the feeder 5 is fitted through a contact hole 1b of the substrate 1, and electrically connected with the substrate 1.

An actuator 10 is additionally provided to one side of the substrate 1. The actuator 10 comprises a vibration motor 12 to generate vibration upon application of electric power resulting from receipt of call termination signals, and a speaker 11 to generate sound upon application of electric power: The actuator 10 can comprises a pair of speakers 11 in order to provide effect of stereo sound.

If such an antenna module 2 is provided as a built-in type antenna to the terminal body, it is possible to provide the aesthetic appearance to the terminal, and enhance portability thereof. However, in order to miniaturize the terminal while maintaining or enhancing performance in terms of transmission/reception efficiency, and frequency receipt property of the antenna, it is necessary to maintain or increase an occupying area of the antenna in comparison to the area of the antenna in a general terminal.

However, since the terminal body has a restricted accommodation space, it is difficult to maintain or increase the area of the antenna in the miniaturized terminal, and there is a limit to enhance the performance of the antenna of the miniaturized terminal.

Figure 2:
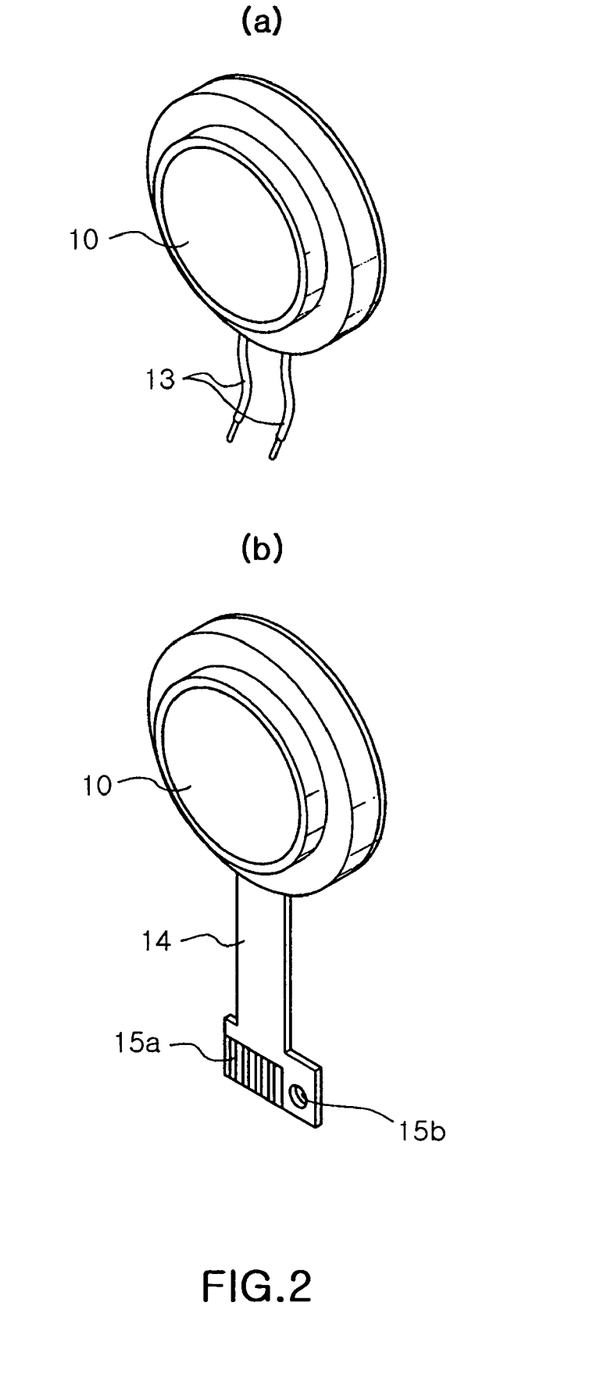
FIGS. 2a and 2b are constructional views illustrating terminals of a conventional-actuator.

For electrical connection between the actuator 10 such as the speakers 11 or the vibration motor 12 and the substrate 1, an end of a conductive wire 13 withdrawn from the actuator 10 is soldered to an upper surface of the substrate, as shown in FIG. 2a. Alternatively, as shown in FIG. 2b, one end 15a of a flexible substrate 14 withdrawn from the actuator 10 is inserted to a connector (not shown) of the substrate, and a guide hole 15b for assembly is formed to the other end of the flexible substrate 14.

However, such a connecting operation between the conventional actuator 10 and the substrate requires a predetermined amount of soldering pads, each having a predetermined size, on the upper surface of the substrate, and a small area of the pad causes electrical short between adjacent patterns in manual soldering, increasing the frequency of defective products.

Furthermore, since soldering of the end of the conductive wire 13 to the substrate or inserting of the flexible substrate 14 to the connector of the substrate makes the connecting operation cumbersome and complicated, there is a problem in that productivity in assembling operation of the actuator to the substrate is lowered.

SUMMARY OF THE INVENTION

The present invention has been made to solve the above problems, and it is an object of the present invention to provide an actuator module of a wireless communication terminal, which allows more convenient electrical connection between an actuator and a substrate while reducing manufacturing costs thereof.

It is another object of the present invention to an actuator module of a wireless communication terminal, which allows more convenient assembly of the actuator and the substrate via efficient use of an inner space defined in a terminal body.

In accordance with one aspect of the present invention, the above and other objects can be accomplished by the provision of an actuator module of a wireless communication terminal, comprising: at least one actuator; an upper base for receiving the actuator on a lower surface thereof; a lower base assembled to the upper base to define an inner space of a predetermined volume therebetween; and a connecting member having a body fixed to an upper surface of the lower base, one end of the body being exposed from a lower surface of the lower base, and the other end thereof being electrically connected with the actuator when coupling the upper and lower bases.

Preferably, the actuator comprises a pair of speakers to generate sound upon application of electric power.

Preferably, the actuator comprises a speaker to generate sound upon application of electric power, and a vibration motor to generate vibration upon application of electric power.

Preferably, the actuator comprises at least one multifunctional actuator to selectively generate sound and vibration upon application of electric power.

Preferably, the actuator comprises an anode contact terminal, and a cathode contact terminal protruding from a lower surface thereof. The anode and cathode contact terminals are coil springs or plate springs to resiliently contact the connecting member.

Preferably, the upper base has a seat portion depressed at the lower surface thereof to allow the actuator to be seated on the seat portion.

More preferably, the seat portion has at least one flat portion formed on an inner surface thereof so as to be brought into plane-to-plane contact with at least one positioning portion formed on an outer surface of the actuator.

More preferably, the seat portion has at least one sound emitting aperture to discharge the sound from the actuator to an outside.

Preferably, the upper base comprises a plurality of vertical protrusions formed on the lower surface thereof, and inserted to a plurality of lower holes formed on the upper surface thereof of the lower base.

Preferably, the lower base comprises a plurality of assembly protrusions formed on the upper surface thereof, and inserted to a plurality of fixing holes formed on the connecting member.

More preferably, after being inserted to the fixing holes of the connecting member, the assembly protrusions are melted therein by heat, and fused to the connecting member.

Preferably, the lower base comprises a plurality of holding ribs formed on the upper surface thereof, and supported by an outer periphery of the connecting member.

Preferably, the lower base comprises a plurality of first terminal withdrawing holes formed on the upper surface thereof to allow one end of the connecting member to be downwardly withdrawn therethrough.

Preferably, the actuator module further comprises a gasket provided to a coupling interface between the upper and lower bases to prevent sound from spreading to the outside through the coupling interface.

Preferably, the upper and lower bases comprise dielectrics.

Preferably, the connecting member is a metallic conductive member comprising at least two separate terminals.

More preferably, the separate terminals are divided by cutting a plurality of cutting sections formed on the connecting member so as to correspond to a plurality of notches depressed on the upper surface of the lower base.

More preferably, the separate terminals comprises a planar terminal fixed to the upper surface of the lower base to be electrically connected with the actuator, and a first resilient terminal withdrawn through the lower surface of the lower base to be electrically connected with the substrate.

Preferably, the upper base is provided with at least one radiator.

More preferably, the radiator has substantially the same size as that of the upper surface of the upper base in order to maximize transmission and receipt performance of the antenna.

More preferably, the radiator is an antenna pattern plate detachably assembled to the upper surface of the upper base.

More preferably, the radiator has at least one second resilient terminal integrally formed to one side thereof, and protruding a predetermined length from the lower surface of the lower base to be connected with the substrate.

More preferably, the radiator is an antenna pattern printed on an outer surface of the base.

More preferably, the radiator is provided with an opening having substantially the same size as that of the sound emitting hole of the upper base.

BRIEF DESCRIPTION OF THE DRAWINGS

The above and other objects, features and other advantages of the present invention will be more clearly understood from the following detailed description taken in conjunction with the accompanying drawings:

FIGS. 3a and 3b shows an actuator module of a wireless communication terminal in accordance with the present invention, in which

DESCRIPTION OF THE PREFERRED EMBODIMENTS

Preferred embodiments will now be described in detail with reference to the accompanying drawings.

As shown in FIGS. 3 to 6, an actuator module 100 according to the present invention allows connection between a substrate and components, which generates sounds or vibration upon application of electric power, to be conveniently performed without soldering, and maximizes efficient use of a space within a terminal via integration with an antenna component which serves to transmit or receive electric waves. The actuator module 100 comprises at least one actuator 110, upper and lower bases 120 and 130, and a connecting member 140.

Figure 3:
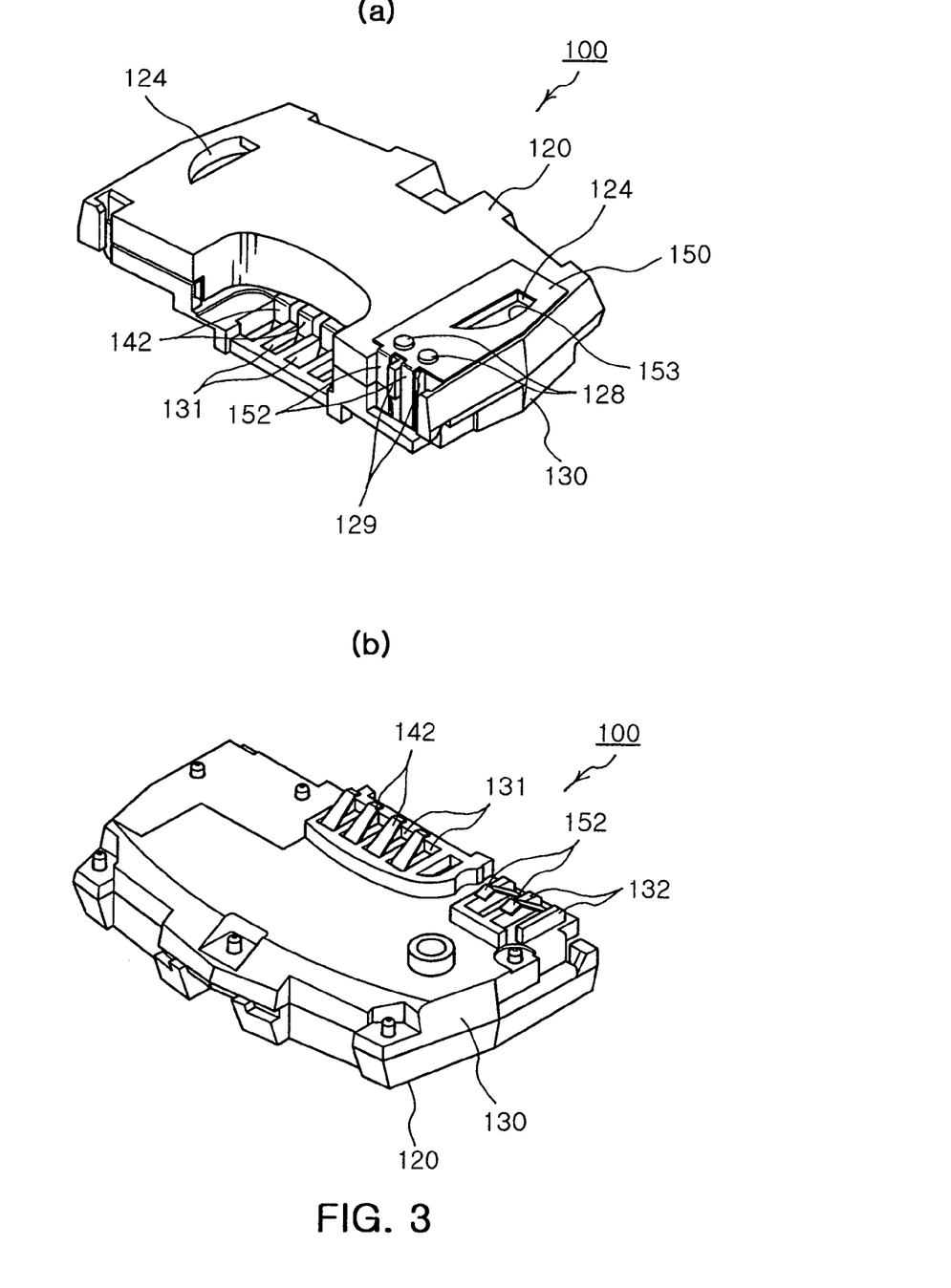
FIG. 3a is a perspective view illustrating the actuator module seen from above.
FIG. 3b is a perspective view illustrating the actuator module seen from below.
Figure 4:
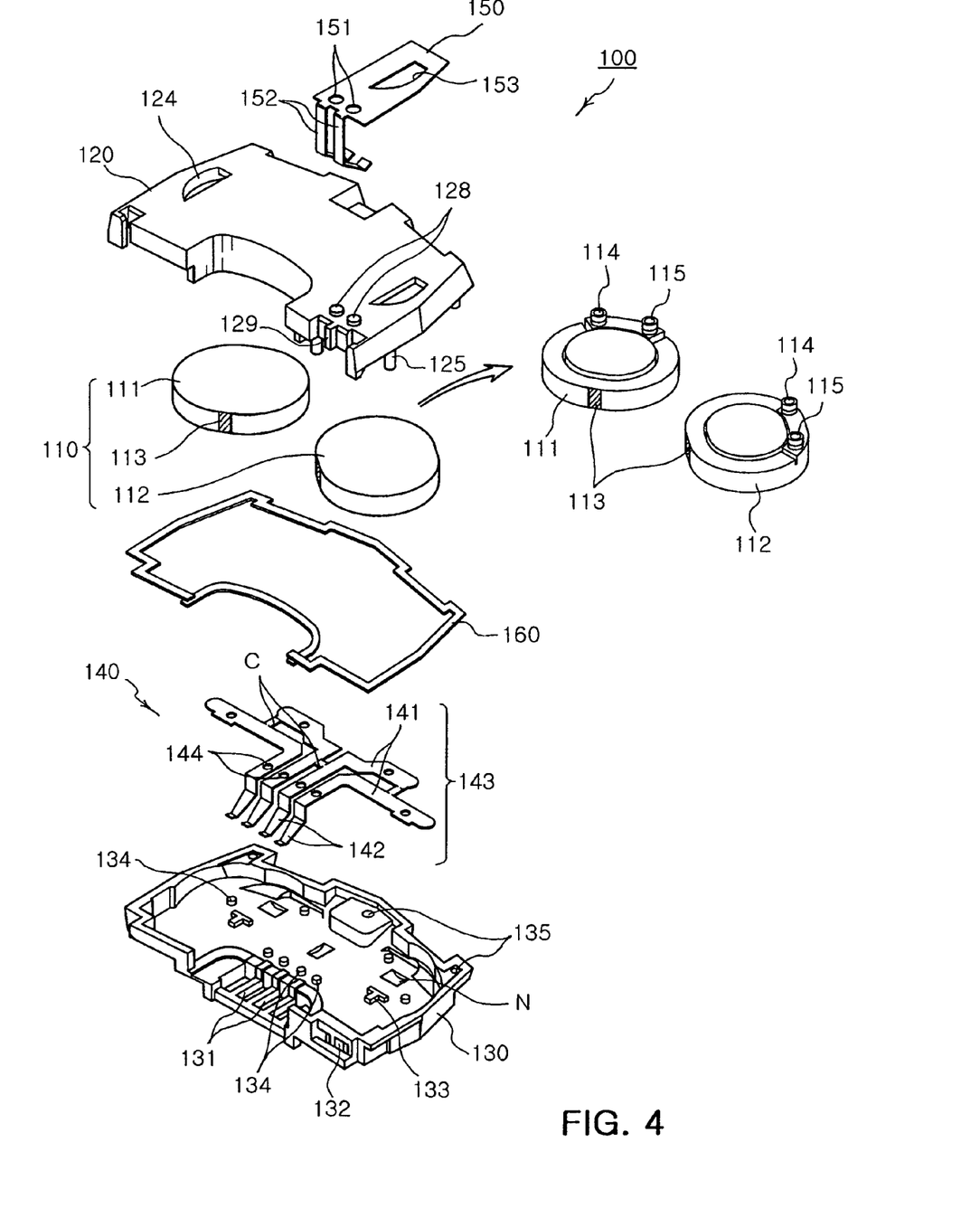
FIG. 4 is an exploded perspective view illustrating the actuator module of the wireless communication terminal in accordance with the present invention.
Figure 5:
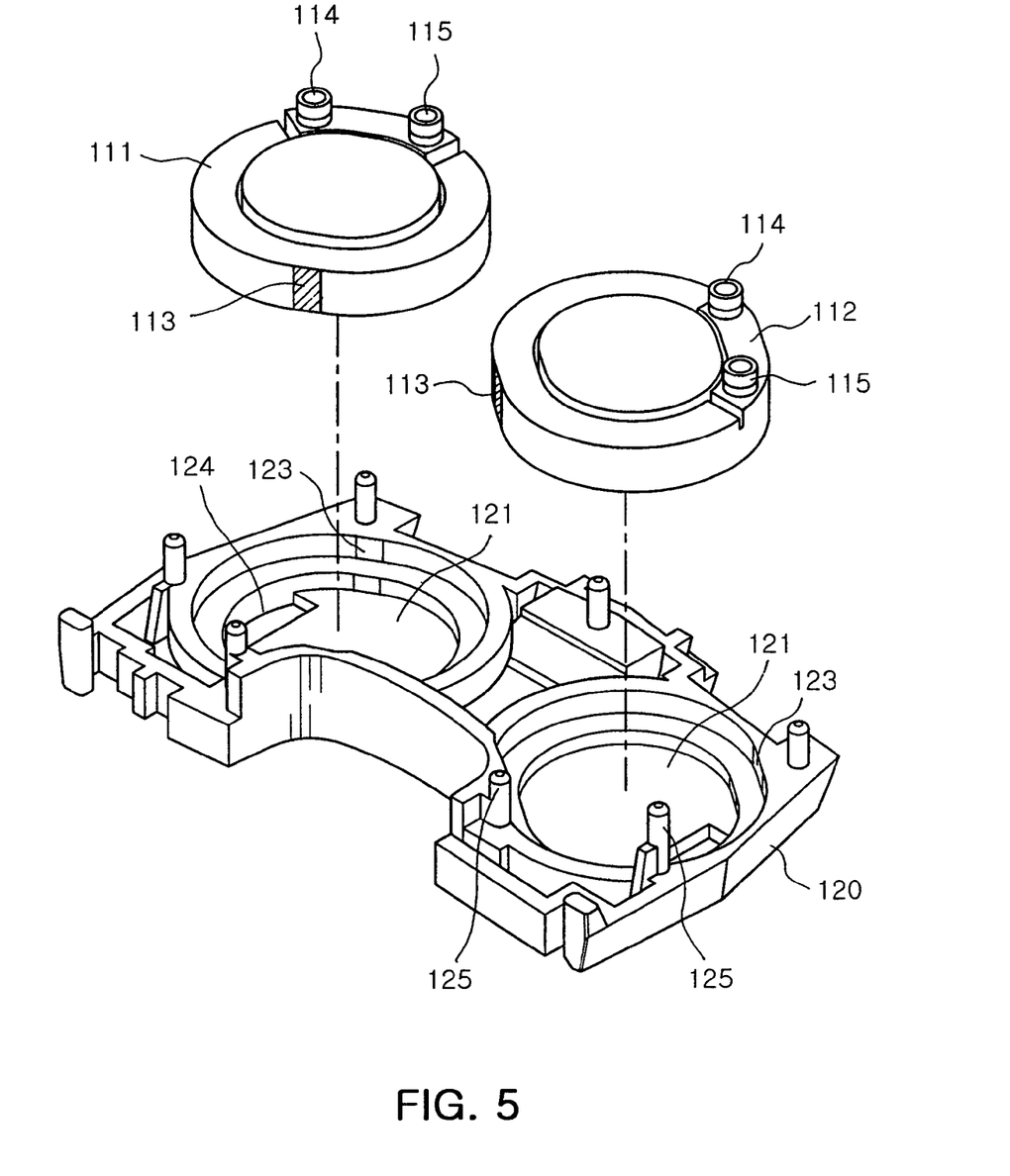
FIG. 5 is an assembly view illustrating an assembled state of an upper base and an actuator of the actuator module in accordance with the present invention.

As shown in FIGS. 3 to 5, the actuator 110 is constituted by at least one electric component positioned at any position on the upper base 120 to generate sound or vibration upon application of electric power.

The upper base 120 is a dielectric structure to receive the actuator 110 on a lower surface thereof, and the lower base 130 is a dielectric structure to receive the connecting member 140 on an upper surface thereof.

When the upper and lower bases 120 and 130 are coupled, the upper and lower bases 120 and 130 defines an inner space of a predetermined volume therebetween to surround the actuator 110, and provide an electrical connection between the actuator and the connecting member, which is disposed to be easily connected with the substrate.

The actuator 110 may be constituted by a pair of speakers 111 and 112 positioned at right and left sides to generate stereo sound upon application of electric power. Alternatively, the actuator 110 may be constituted by a speaker 111 to generate sound upon application of electric power, and a vibration motor 112 to generate vibration upon application of electric power.

Alternatively, the actuator 110 may be constituted by at least one multifunctional actuator to selectively generate sound and vibration upon application of electric power.

The actuator 110 comprises a cathode-contact terminal 114, and an anode-contact terminal 115 vertically protruding a predetermined length from a lower surface thereof. Preferably, the cathode-contact terminal 114, and the anode-contact terminal 115 are implemented by a coil spring or a plate spring such that a free end thereof is brought into resilient contact with an upper surface of the connecting member 140.

As shown in FIG. 5, the upper base 120 has a seat portion 121 depressed a predetermined depth on the lower surface thereof to allow the upper surface of the actuator 110 to be seated thereon. In order to allow the actuator 110 to be always inserted in one direction upon assembling the actuator 110 to the upper base 120, the seat portion 121 has at least one flat portion 123 brought into plane-to-plane contact with at least one positioning portion 113 formed on an outer surface of the actuator 110.

The seat portion 121 of the upper base 120 has at least one sound emitting aperture 124 serving to easily discharge the sound to an outside upon operation of the actuator 110.

The upper base 120 comprises a plurality of vertical protrusions 125, which are formed on the lower surface thereof, and inserted to a plurality of lower holes 135 formed on the upper surface thereof when coupling the upper base 120 to the lower base 130.

As shown in FIGS. 4 and 5, the lower base 130 comprises a plurality of assembly protrusions 134, which are formed on the upper surface thereof, and inserted to a plurality of fixing holes 144 formed in the connecting member 140.

After being inserted to the fixing holes 144 of the connecting member 140, the assembly protrusions 134 are melted therein by heat, and fused to the connecting member 140. Accordingly, the connecting member 140 can be integrally fixed to the lower surface of the lower base 130, so that the connecting member 140 can be easily divided into a plurality of separate terminals 143 by cutting respective cutting sections C of the connecting member 140.

Preferably, the lower base 130 comprises a plurality of holding ribs 133 in order to prevent the connecting member 140 from moving in the horizontal direction.

Preferably, in order to allow an efficient cutting operation of the cutting portion C, a plurality of U-shaped or V-shaped notches N are depressed a predetermined depth on the upper surface of the lower base 130 at positions corresponding to the cutting sections C of the connecting member 140 fixed to the assembly protrusions 134.

The lower base 130 comprises a plurality of first terminal withdrawing holes 131 formed at one side of the upper surface such that one end of the connecting member 140 is downwardly withdrawn through the lower base 130, and is exposed below the lower base 130. In addition, a second terminal withdrawing hole 132 is formed near the first terminal withdrawing holes 131 such that one end of a radiator described below is withdrawn through the second terminal withdrawing hole 132.

The actuator module further comprises a gasket 160 provided to a coupling interface between the upper and lower bases 120 and 130, which can be formed when coupling the upper and lower bases 120 and 130 by inserting the vertical protrusions 125 of the upper base 120 to the lower holes 135 of the lower base 130, in order to prevent the sound from spreading to the outside through the coupling interface upon operation of the actuator 110.

Meanwhile, the connecting member 140 provided to the lower base 130 to electrically connect the actuator 110 with the substrate is a conductive metal plate. When the upper and lower bases 120 and 130 are coupled, a body of the conductive metal plate is fixed to the upper surface of the lower base 130 so as to be electrically connected with the cathode-contact terminal 114 and the anode-contact terminal 115 of the actuator 110 positioned in the upper base 120, and one end thereof is exposed through the lower surface of the lower base 130 so as to be connected with the substrate.

The connecting member 140 comprises at least two separate terminals 143 connected with the cathode-contact terminal 114 and the anode-contact terminal 115 of the actuator 110, respectively. The separate terminals 143 are divided by cutting the plurality of cutting sections C provided to the connecting member 140 so as to correspond to the plurality of notches N depressed on the upper surface of the lower base 130 when assembling the lower base 130 to the connecting member 140.

The separate terminals 143 comprise at least one planar terminal 141, which is fixed to the upper surface of the lower base while being electrically connected with the cathode-contact terminal 114 and the anode-contact terminal 115 of the actuator 110, and first resilient terminals 142, which are withdrawn from the lower surface of the lower base 130 through the first terminal withdrawal holes 131 of the lower base 130, and bent to resiliently contact a pattern circuit on the substrate.

Figure 6:
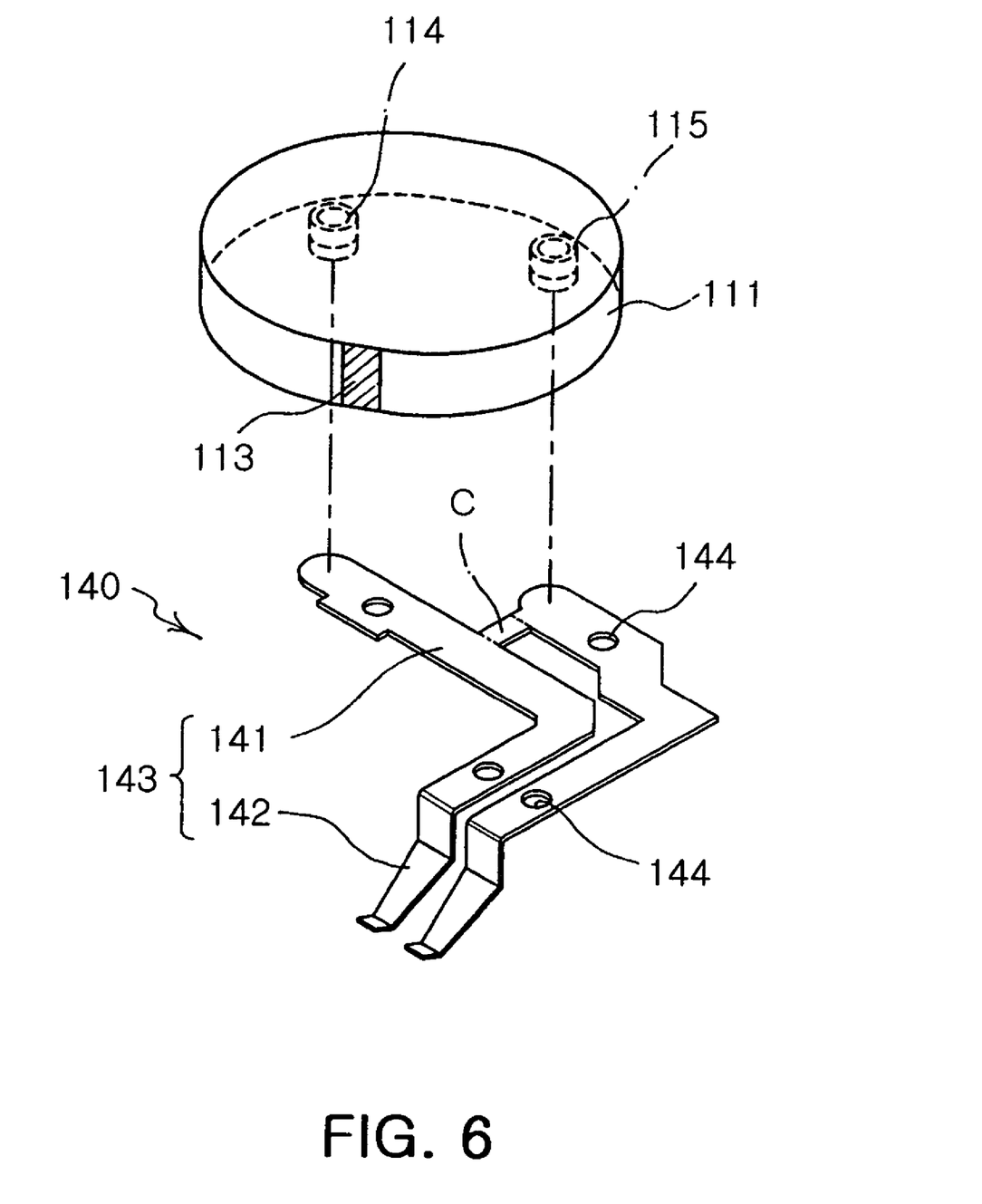
FIG. 6 is an assembly view illustrating a method for connecting one actuator with one connecting member in the actuator module of the wireless communication terminal in accordance with the present invention.

More specifically, when two actuators 111 and 112 are provided between the upper and lower bases 120 and 130, the connecting member 140 comprises four separate terminals 143 formed by cutting three cutting sections C, as shown in FIG. 4. Alternatively, when one actuator 111 is provided between the upper and lower bases 120 and 130, the connecting member 140 comprises two separate terminals 143 formed by cutting two cutting sections C, as shown in FIG. 6.

Meanwhile, as shown in FIGS. 3a and 4, at least one radiator 150 is equipped on the upper surface of the upper base 120, and serves to convert electric signals transmitted from the substrate within a terminal body (not shown) to electric waves, and to radiate the electric waves to the outside. The radiator 150 also serves to receive an electric wave in a predetermined frequency band transmitted from the outside.

Preferably, the radiator 150 has substantially the same size as the upper surface of the upper base 120 in order to maximize transmission and receipt performance of the antenna.

The radiator 150 is provided with an opening 153 having substantially the same size as that of the sound emitting hole 124 formed on the upper surface of the upper base 120.

The radiator 150 can be formed as an antenna pattern plate, which has a plurality of fitting holes 151 formed therethrough, and assembled to a plurality of fitting protrusions 128 formed on the upper surface of the upper base 120 such that the radiator 150 can be detachably assembled to the upper surface of the upper base 120. However, it should be noted that the present invention is not limited to this structure, and that the radiator 150 can be formed in various shapes depending on designs thereof.

Preferably, the radiator 150 is a planar antenna such as a micro-strip patch antenna or an inverted F-type antenna.

The radiator 150 may be an antenna pattern printed on an outer surface of the upper base 120.

The radiator 150 has one or more second resilient terminals 152 integrally formed thereto, and positioned on a guide rib 129 at one side of the upper base 120 when the radiator 150 is detachably assembled to the upper surface of the upper base 120. Each second resilient terminal 152 is bent such that, when the radiator 150 is assembled to the upper surface of the upper base 120, the second resilient terminal 152 protrudes a predetermined length below the lower surface of the lower base 130 through the second terminal withdrawing hole 132, and resiliently connected with an upper surface of the substrate.

At this time, the second resilient terminals 152 comprise a power supply terminal and a grounding terminal, which are connected with a power supply end and a grounding end printed in a pattern on the substrate (not shown), respectively, and are prevented from being brought into contact with each other by means of the guide rib 129.

Figure 7A:
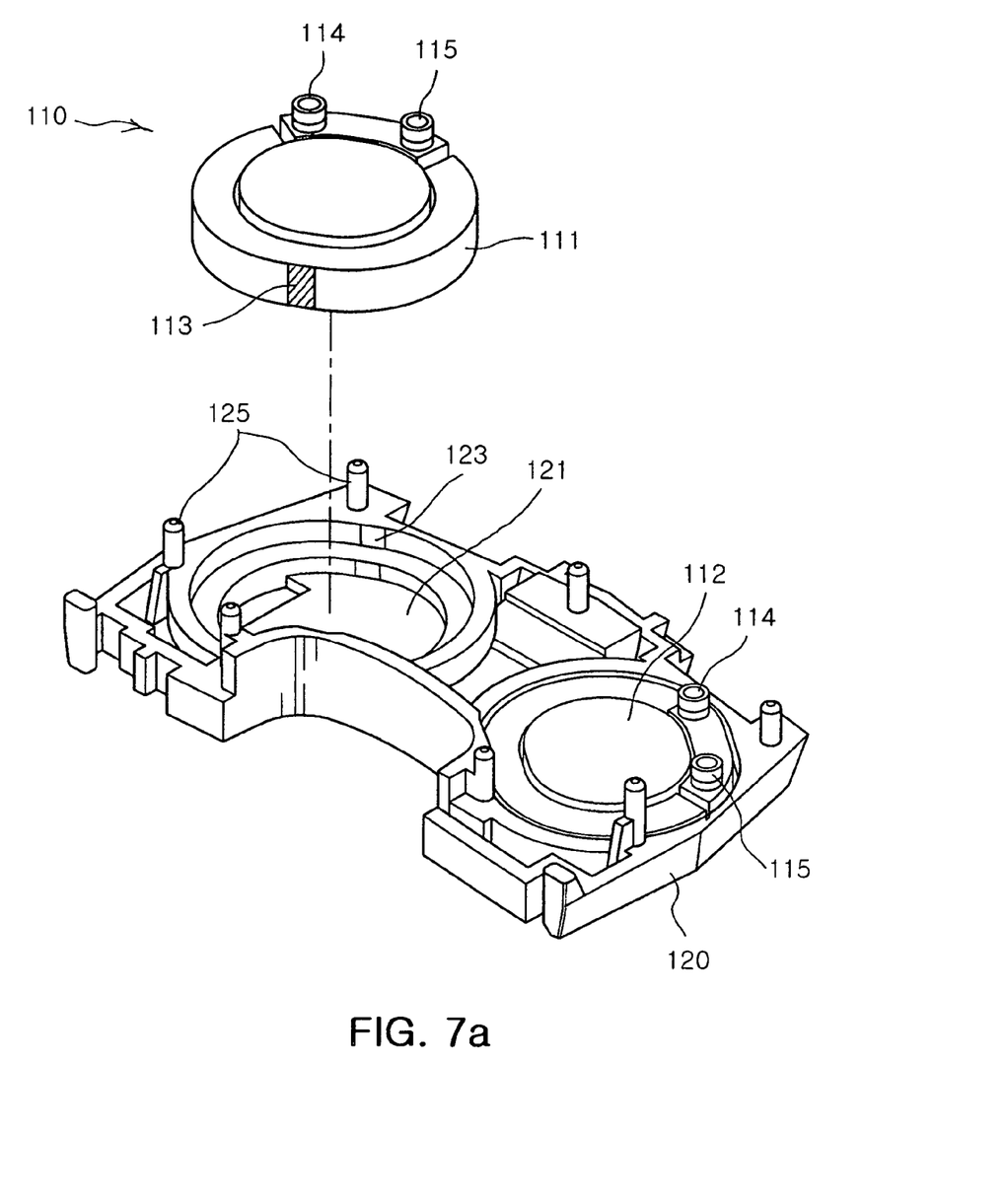
FIGS. 7a to 7e are sequential views for illustrating an assembly operation of the actuator module of the wireless communication terminal in accordance with the present invention.

An assembling operation of the actuator module 100 of the invention to the substrate of the terminal body (not shown) will be described as follows. First, as shown in FIG. 7a, the actuator 110 and the upper base 120 are assembled by coupling the actuator 110 to the upper base 120, at which the upper base 120 is inverted to allow the seat portion 121 to face upward, and the actuator 110 is inverted to allow the cathode-contact terminal 114 and the anode-contact terminal 115 to face upward.

At this time, since the actuator 110 has the positioning portion 113 formed on the outer periphery thereof, and the seat portion 121 has the flat portion 123 formed therein in order to allow the actuator 110 to be always inserted in a predetermined direction upon assembly of the actuator 110 and the upper base 120, the positioning portion 113 of the actuator 110 is brought into plane-to-plane contact with the flat portion 123 of the seat portion 121 when assembling the actuator 110 to the upper base 120.

Figure 7B:
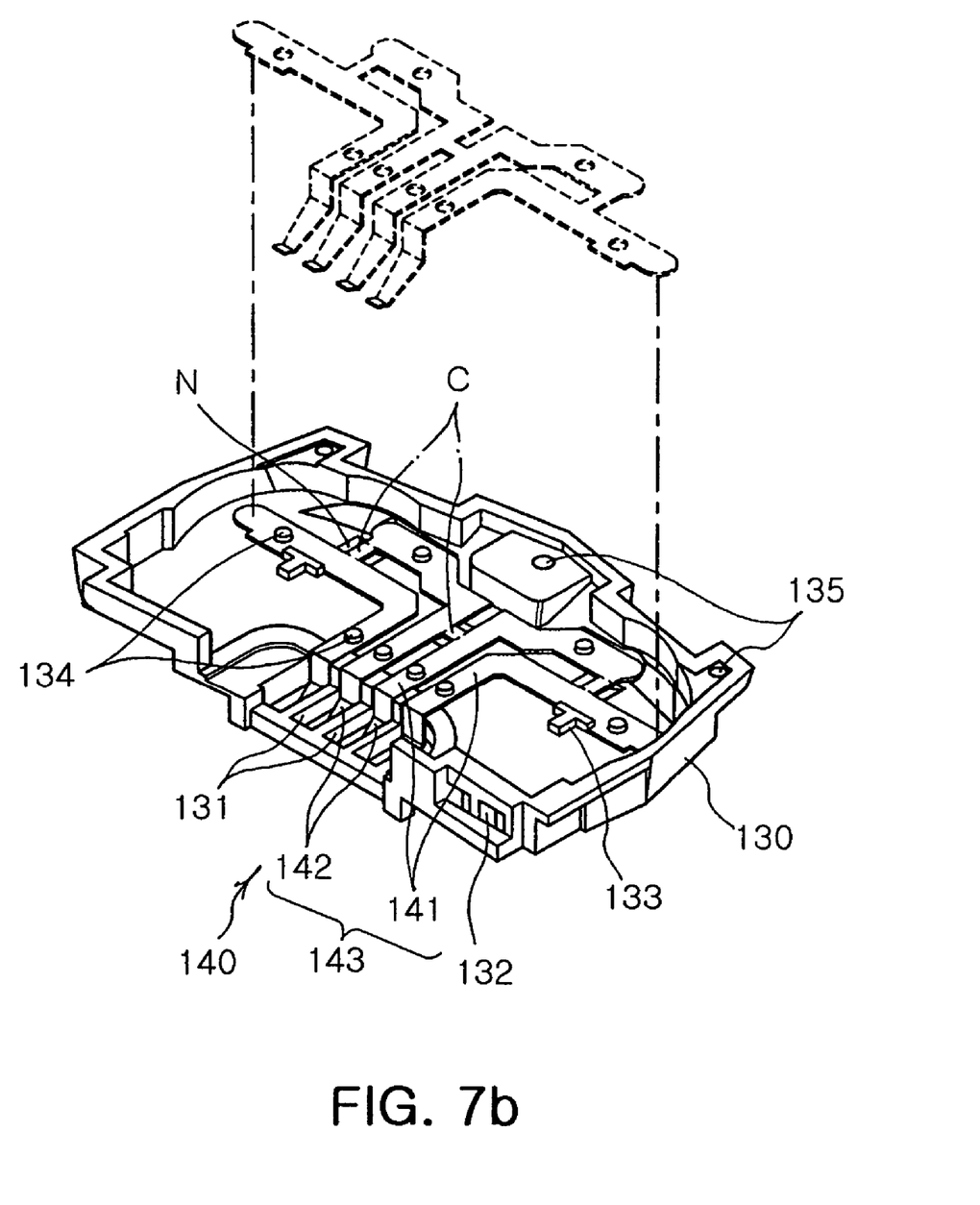

When assembling the connecting member 140 to the lower base 130, the plurality of separate terminals 143 connected with each other through the cutting sections C to a single body such as the connecting member 140 is positioned directly above the lower base 130, as shown in FIG. 7b.

In this state, when the fixing holes 144 of the respective separate terminals 143 of the connecting member 140 are inserted onto the assembly protrusions 134, an outer periphery of the connecting member 140 is held by the holding ribs 133 so as not to move left or right, and the respective first resilient terminals 142 of the separate terminals 143 are exposed from the lower surface of the lower base 130 through the first terminal withdrawing holes 131 of the lower base 130. At this time, the cutting section C of the connecting member 140 correspond to the notches N of the lower base 130.

Figure 7C:
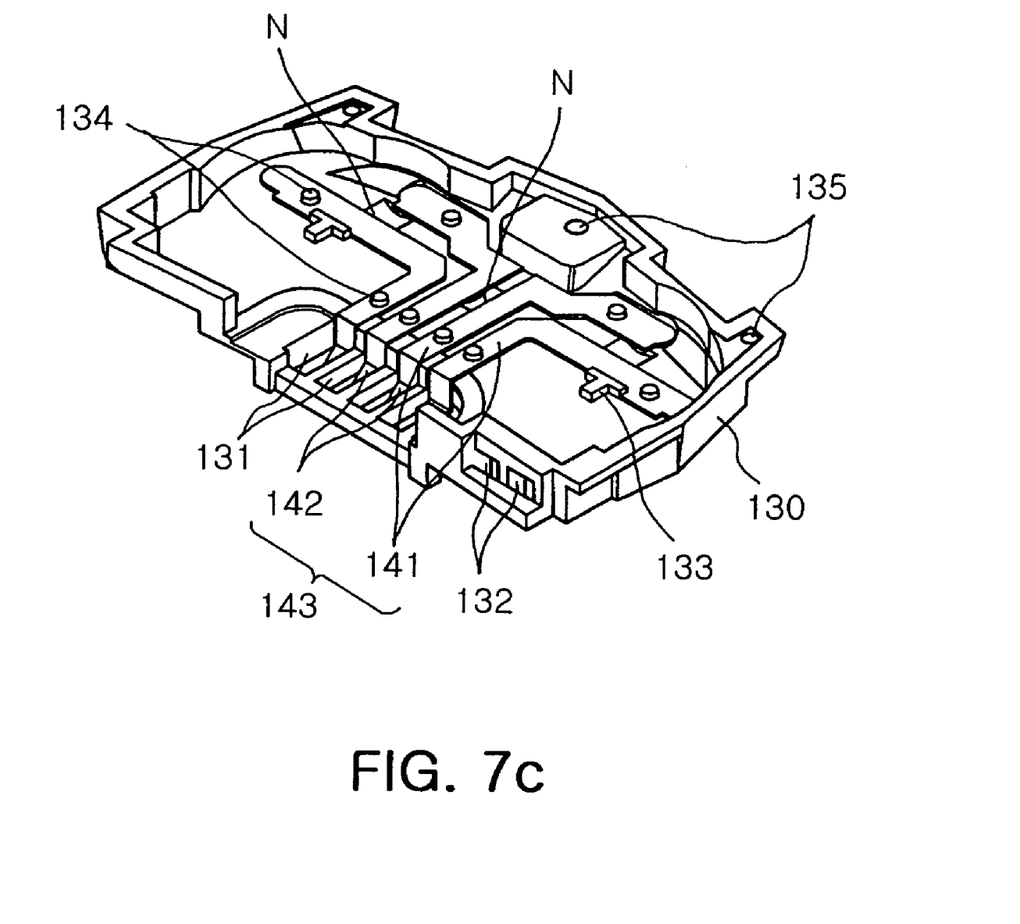

Next, in a state wherein upper ends of the respective assembly protrusions 134 exposed through the fixing holes 144 are melted via heat, and fused to the connecting member 140, the connecting member 140 are separated into the plurality of separate terminals 143 by cutting the cutting section C of the connecting member 140 with a cutter (not shown), so that the separate terminals 143 are securely fixed by the assembly protrusions 134 fused to the connecting member 140.

Figure 7D:
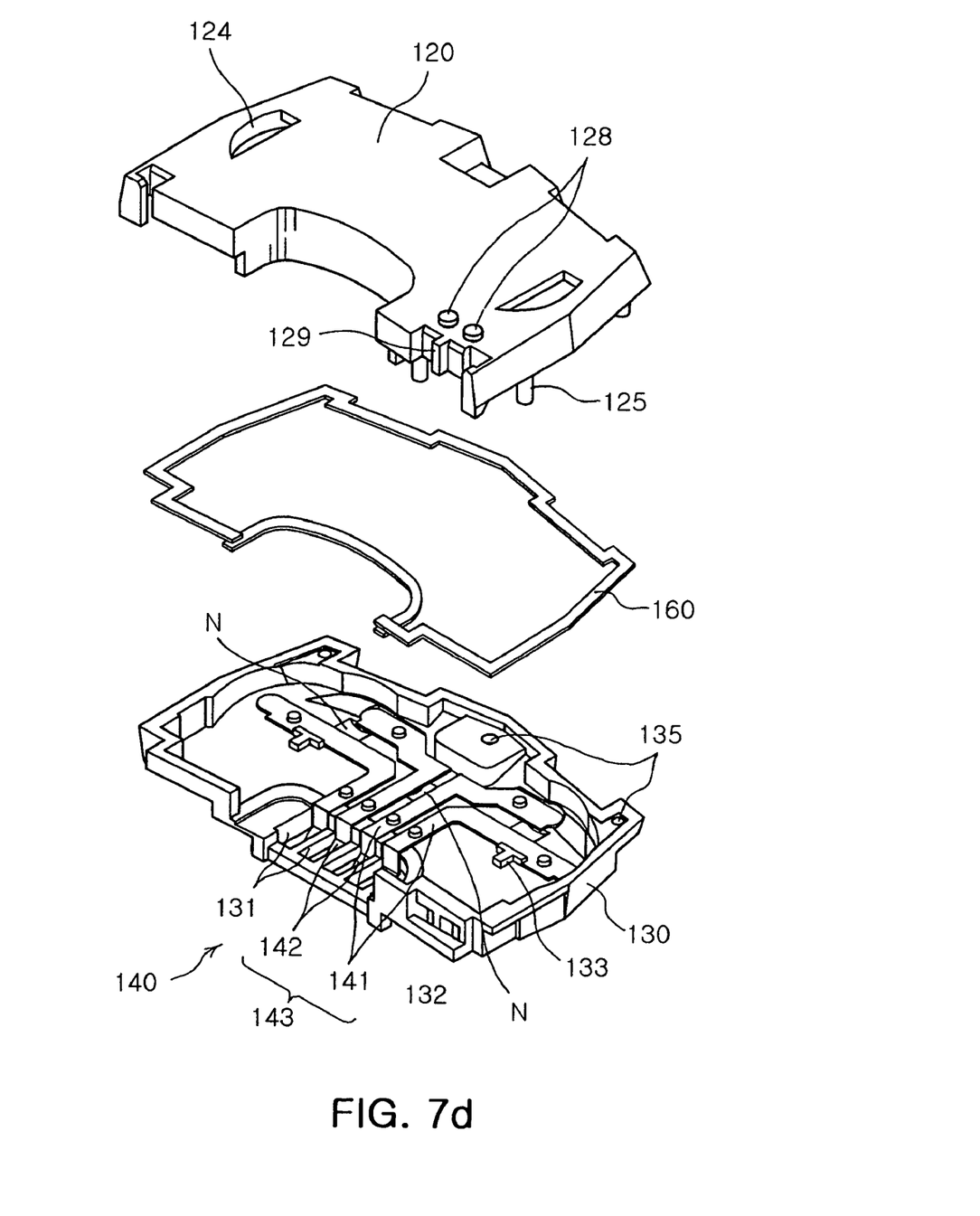

When coupling the upper base 120 having the actuator 110 to the lower base 130 having the separate terminals 143, the vertical protrusions 125 of the upper base 120 are fitted to the lower holes 135 of the lower base 130 with the upper base 120 disposed at an upper portion and the lower base 130 disposed at a lower portion as shown in FIG. 7d. Then, the upper and lower bases 120 and 130 are coupled to each other via the gasket 160 disposed at the coupling interface between the upper and lower bases 120 and 130.

When the upper and lower bases 120 and 130 are coupled to each other, the cathode-contact terminal 114 and the anode-contact terminal 115 of the lower surface of the actuator 110 are connected with one end of the respective separate terminals 143 fixed to the upper surface of the lower base 130 with accuracy and resiliency. In addition, the actuator 110 is embedded together with the connecting member 130 within the inner space between the upper and lower bases 120 and 130.

Figure 7E:
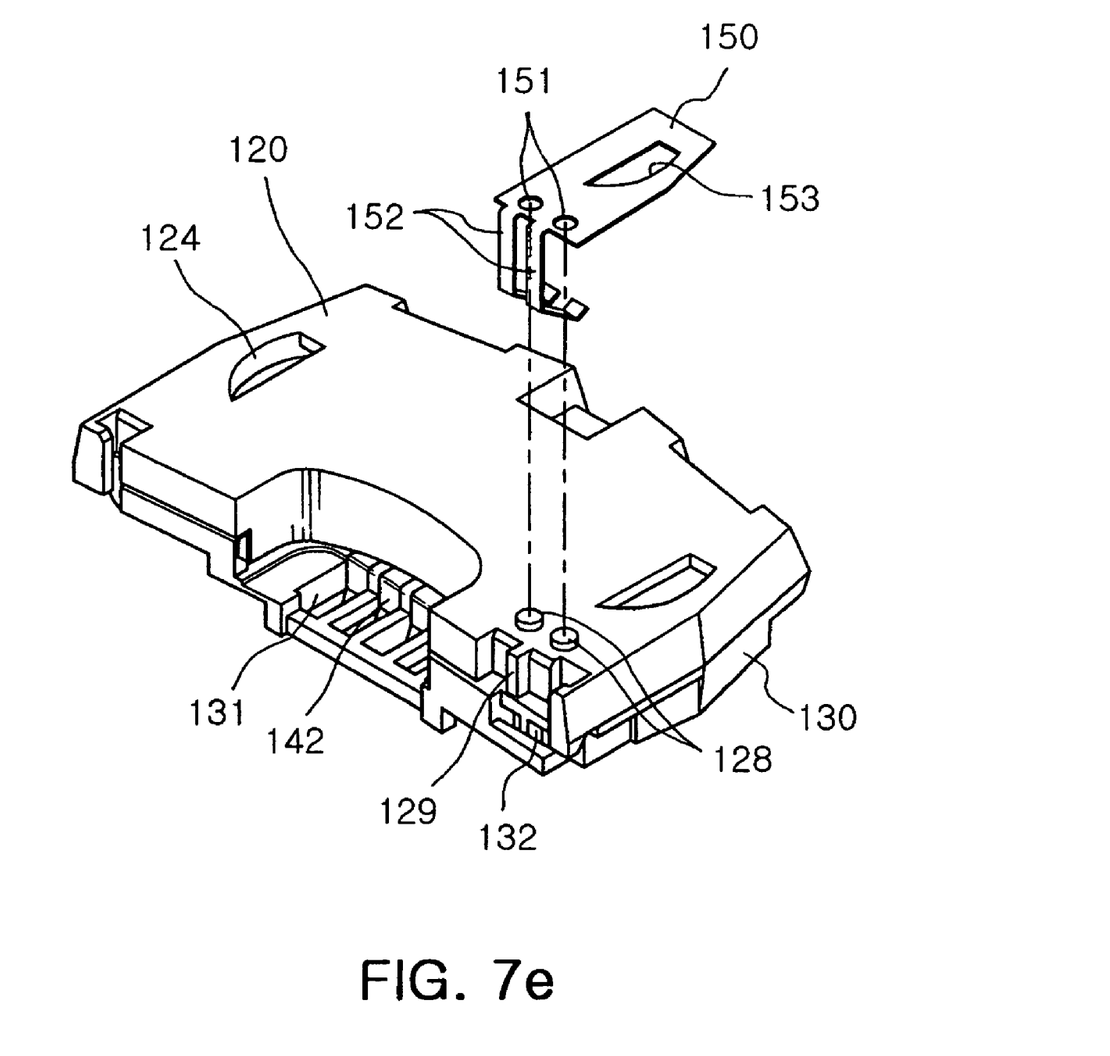

In an assembling operation of the radiator 150 to the upper base 120, the radiator 150 is integrally fixed to the upper surface of the upper base 120 by placing the radiator 150 on the upper surface of the upper base 120, and then inserting the fitting protrusions 128 of the upper base 120 into the fitting holes 151 of the radiator 150, respectively.

Then, the second resilient terminals 152 of the radiator 150 are positioned not so as to contact each other by means of the guide rib 129 of the upper base 120 while being exposed below the lower surface of the lower base 130 through the second terminal withdrawing hole 132 of the lower base 130.

Accordingly, when the assembly of the upper and lower bases 120 and 130 having the radiator 150 positioned thereon is mounted on the substrate (not shown), the first and second resilient terminals 142 and 152 protruding through the lower surface of the lower base 120 are electrically connected with the pattern circuit on the substrate. With this structure, the actuator 110 is operated to generate sound or vibration via electric power supplied through the resilient terminals 142, the separate terminals 143, the cathode-contact terminal 114, and the anode-contact terminal 115.

In addition, external or internal electric waves are received or transmitted through the radiator 150 having the second resilient terminals 152, so that the actuator module 100 can efficiently perform the function of an antenna.

As apparent from the above description, according to the present invention, the actuator module comprises the lower base which has the actuator positioned therein, and the upper base which has the connecting member divided into the plurality of separate terminals and positioned therein. With this structure, when the upper and lower bases are coupled to each other, the separate terminals divided before coupling the upper and lower bases are conveniently connected with the actuator, and when the coupled upper and lower bases are assembled to the substrate, the first resilient terminals of the separate terminals are electrically connected with the substrate conveniently and rapidly without soldering, so that the actuator can be conveniently connected with the substrate, thereby enhancing work productivity while reducing manufacturing costs.

In addition, according to the present invention, the radiator is provided to the upper base which is coupled to the lower base. With this structure, when the coupled upper and lower bases are assembled to the substrate, the second resilient terminals of the radiator are electrically connected with the substrate with rapid, thereby enhancing assembly productivity of the actuator having a built-in type antenna.

Furthermore, since the actuator and the radiator are integrated to the assembly of the upper and lower bases, it is possible to maximize efficient use of the inner space of the terminal body while miniaturizing the communication terminal.

It should be understood that the embodiments and the accompanying drawings have been described for illustrative purposes, and the present invention is limited only by the following claims. Further, those skilled in the art will appreciate that various modifications, additions and substitutions are allowed without departing from the scope and spirit of the invention according to the accompanying claims.

What is claimed is:

1. An actuator module of a wireless communication terminal, comprising:
    at least one actuator having a positioning portion formed on an outer surface thereof;
    an upper base configured to receive the actuator on a lower surface thereof;
    a lower base assembled to the upper base to define an inner space of a predetermined volume therebetween; and
    a connecting member having a cutting section, a body fixed to an upper surface of the lower base, one end of the body being exposed from a lower surface of the lower base, and the other end thereof being electrically connected with the actuator when coupling the upper and lower bases;
    wherein the connecting member is a conductive plate;
    wherein the lower base comprises a plurality of assembly protrusions formed on the upper surface thereof, and inserted to a plurality of fixing holes formed on the connecting member; and
    wherein, after being inserted to the fixing holes of the connecting member, the assembly protrusions are melted therein by heat, and fused to the connecting member.

2. The actuator module according to claim 1, wherein the actuator comprises a pair of speakers to generate sound upon application of electric power.

3. The actuator module according to claim 1, wherein the actuator comprises a speaker to generate sound upon application of electric power, and a vibration motor to generate vibration upon application of electric power.

4. The actuator module according to claim 1, wherein the actuator comprises at least one multifunctional actuator to selectively generate sound and vibration upon application of electric power.

5. The actuator module according to claim 1, wherein the actuator comprises an anode-contact terminal, and a cathode-contact terminal protruding from a lower surface thereof.

6. The actuator module according to claim 5, wherein the anode and cathode contact terminals are coil springs or plate springs to resiliently contact the connecting member.

7. The actuator module according to claim 1, wherein the upper base has a seat portion depressed at the lower surface thereof to allow the actuator to be seated on the seat portion.

8. The actuator module according to claim 7, wherein the seat portion has at least one flat portion formed on an inner surface thereof so as to be brought into plane-to-plane contact with the positioning portion formed on an outer surface of the actuator.

9. The actuator module according to claim 7, wherein the seat portion has at least one sound emitting aperture to discharge the sound from the actuator to an outside.

10. The actuator module according to claim 1, wherein the upper base comprises a plurality of vertical protrusions formed on the lower surface thereof, and inserted to a plurality of lower holes formed on the upper surface of the lower base.

11. The actuator module according to claim 1, wherein the lower base comprises a plurality of holding ribs formed on the upper surface thereof, and supported by an outer periphery of the connecting member.

12. The actuator module according to claim 1, wherein the lower base comprises a plurality of first terminal withdrawing holes formed on the upper surface thereof to allow one end of the connecting member to be downwardly withdrawn therethrough.

13. The actuator module according to claim 1, further comprising: a gasket provided to a coupling interface between the upper and lower bases to prevent sound from spreading to the outside through the coupling interface.

14. The actuator module according to claim 1, wherein the upper and lower bases comprise dielectrics.

15. The actuator module according to claim 1, wherein the connecting member is a metallic conductive member comprising at least two separate terminals.

16. The actuator module according to claim 15, wherein the separate terminals are divided by cutting a plurality of cutting sections formed on the connecting member so as to correspond to a plurality of notches depressed on the upper surface of the lower base.

17. The actuator module according to claim 15, wherein the separate terminals comprises at least one planar terminal fixed to the upper surface of the lower base to be electrically connected with the actuator, and first resilient terminals withdrawn through the lower surface of the lower base to be electrically connected with the substrate.

18. The actuator module according to claim 1, wherein the upper base is provided with at least one radiator.

19. The actuator module according to claim 18, wherein the radiator has substantially the same size as that of an upper surface of the upper base in order to maximize transmission and receipt performance of the antenna.

20. The actuator module according to claim 18, wherein the radiator is an antenna pattern plate detachably assembled to an upper surface of the upper base.

21. The actuator module according to claim 18, wherein the radiator has at least one second resilient terminal integrally formed to one side thereof, and protruding a predetermined length from the lower surface of the lower base to be connected with the substrate.

22. The actuator module according to claim 18, wherein the radiator is an antenna pattern printed on an outer surface of the base.

23. The actuator module according to claim 18, wherein the radiator is provided with an opening having substantially the same size as that of the sound emitting hole of the upper base.

* * * * *